United States Patent
Takama et al.

(10) Patent No.: US 10,482,651 B2
(45) Date of Patent: Nov. 19, 2019

(54) IMAGE PROCESSING APPARATUS, IMAGE PROCESSING METHOD, AND PROGRAM

(71) Applicant: CANON KABUSHIKI KAISHA, Tokyo (JP)

(72) Inventors: Yasufumi Takama, Kawasaki (JP); Takaaki Endo, Urayasu (JP); Kiyohide Satoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 158 days.

(21) Appl. No.: 15/333,594

(22) Filed: Oct. 25, 2016

(65) Prior Publication Data
US 2017/0124766 A1 May 4, 2017

(30) Foreign Application Priority Data

Oct. 29, 2015 (JP) ................................. 2015-212929

(51) Int. Cl.
G06T 15/08 (2011.01)
G06T 7/00 (2017.01)
G06T 19/00 (2011.01)

(52) U.S. Cl.
CPC ............ *G06T 15/08* (2013.01); *G06T 7/0012* (2013.01); *G06T 19/00* (2013.01);
(Continued)

(58) Field of Classification Search
None
See application file for complete search history.

(56) References Cited

U.S. PATENT DOCUMENTS 5,615,347 A * 3/1997 Davis ................. G06F 3/04847
715/804
6,480,732 B1 * 11/2002 Tanaka ................. A61B 8/5238
128/922
(Continued)

FOREIGN PATENT DOCUMENTS

| CN | 103200421 A | 7/2013 |
| CN | 103428286 A | 12/2013 |
| JP | 2013-70776 A | 4/2013 |

OTHER PUBLICATIONS

Ching-Rong Lin, R. Bowen Loftin, "VR User Interface: Closed World Interaction", Oct. 25, 2000, ACM, VRST '00 Proceedings of the ACM symposium on Virtual reality software and technology, pp. 153-159.*

(Continued)

Primary Examiner — Robert Bader
(74) Attorney, Agent, or Firm — Canon U.S.A., Inc., IP Division

(57) ABSTRACT

An image processing apparatus includes an image acquisition unit configured to acquire volume data, a feature point acquisition unit configured to acquire a coordinate of a feature point of an object in the volume data, a range setting unit configured to set a projection range defining a range of the volume data from which a projection image is to be generated, set a display range defining a range within which feature points are to be displayed, and adjust at least one of the projection range and the display range such that the projection range and the display range satisfy a predetermined relationship; and a display control unit configured to generate the projection image from the volume data according to the projection range and superimpose the feature point in the display range on the projection image.

17 Claims, 7 Drawing Sheets

(52) U.S. Cl.
CPC ............ *G06T 2207/10081* (2013.01); *G06T 2207/10088* (2013.01); *G06T 2207/10116* (2013.01); *G06T 2210/41* (2013.01)

(56) References Cited

U.S. PATENT DOCUMENTS

| | | | |
|---|---|---|---|
| 7,127,091 B2* | 10/2006 | Op De Beek | G06T 15/30 382/128 |
| 2009/0003668 A1* | 1/2009 | Matsumoto | A61B 5/055 382/128 |
| 2015/0042559 A1 | 2/2015 | Li | |

OTHER PUBLICATIONS

Helmut Doleisch, Martin Gasser, Helwig Hauser, "Interactive Feature Specification for Focus+Context Visualization of Complex Simulation Data", Jan. 2003, Eurographics Association, Joint EUROGRAPHICS—IEEE TCVG Symposium on Visualization, pp. 239-248,302.*

Markus Hadwiger, Christoph Berger, Helwig Hauser, "High-Quality Two-Level Volume Rendering of Segmented Data Sets on Consumer Graphics Hardware", Oct. 24, 2003, IEEE, IEEE Visualization 2003, pp. 301-308.*

\* cited by examiner

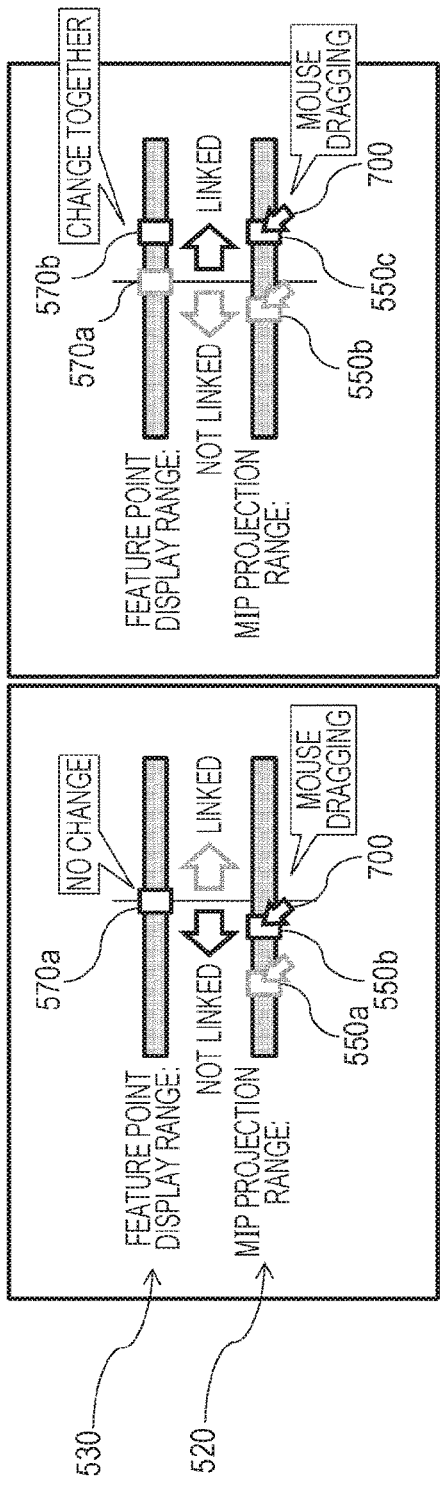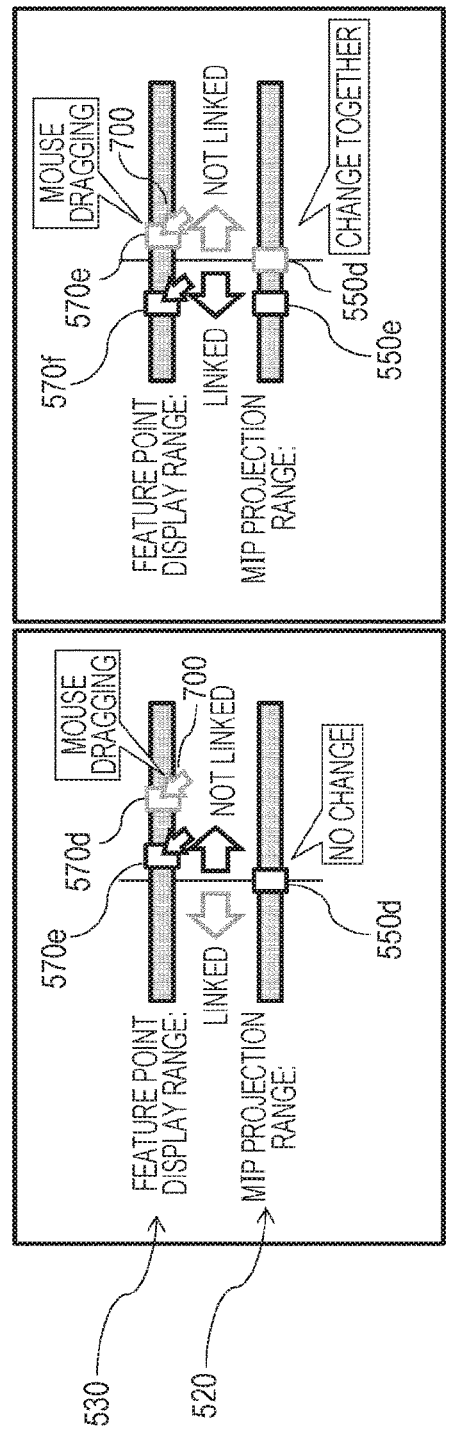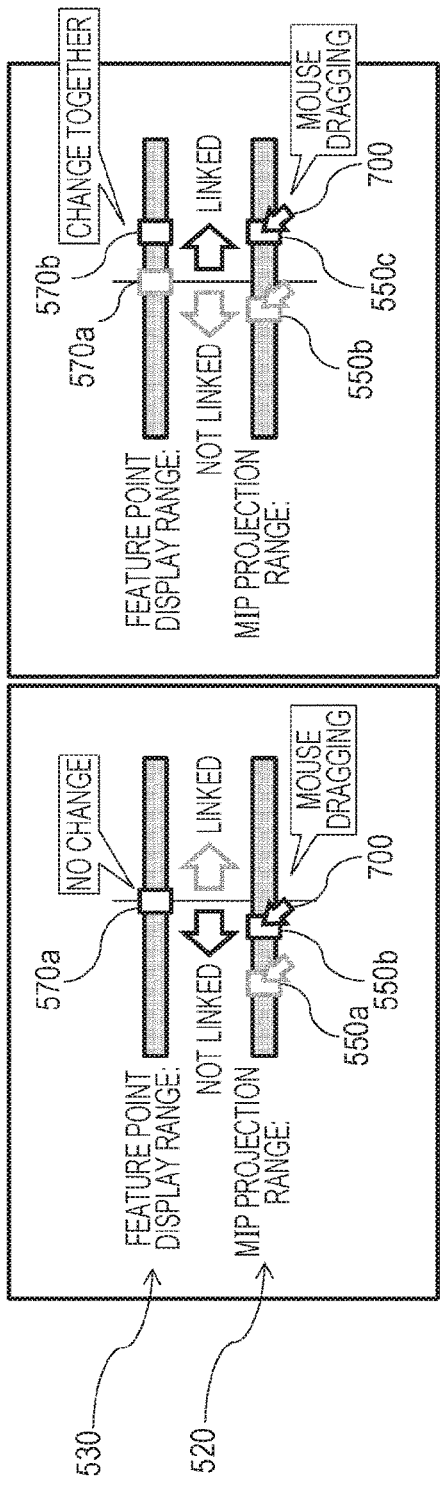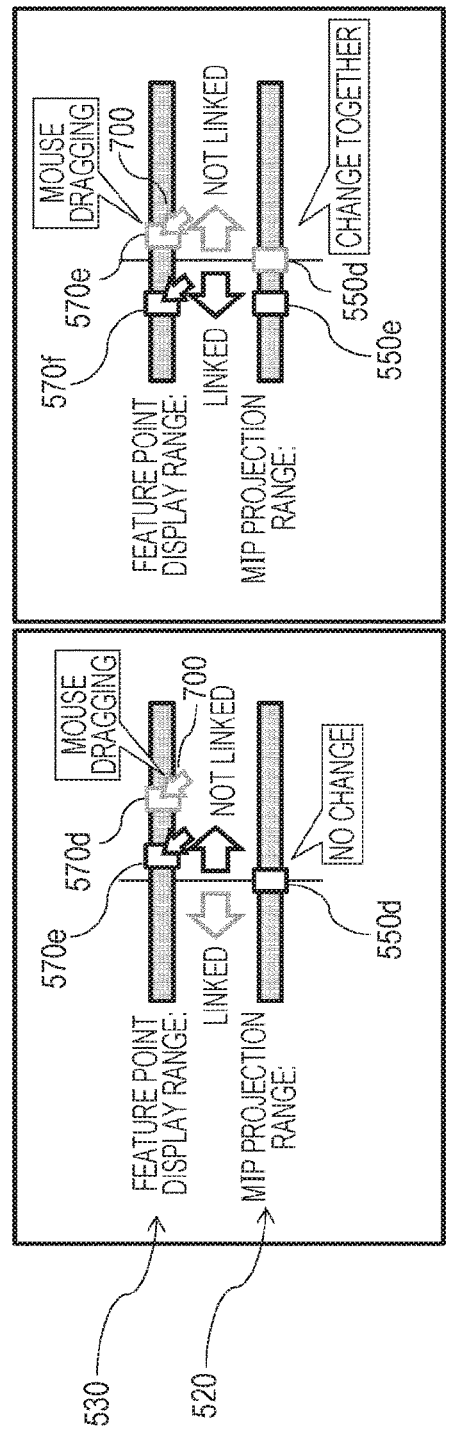

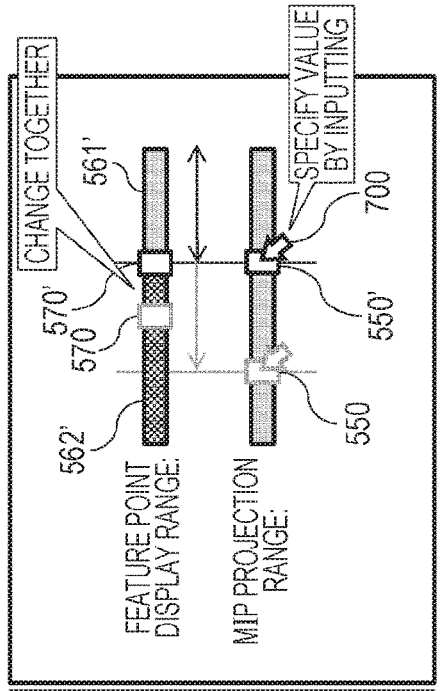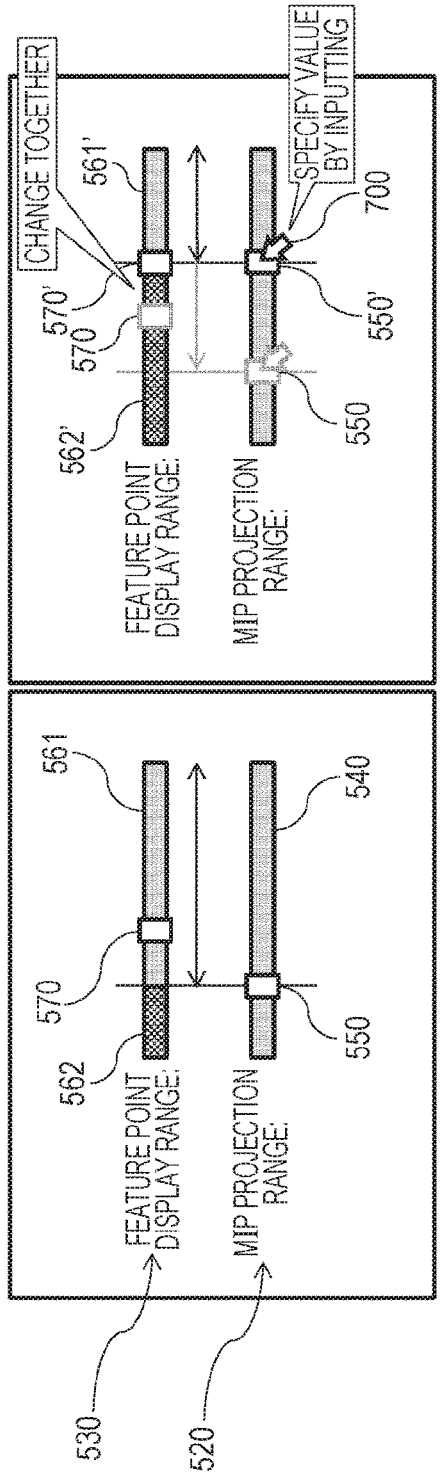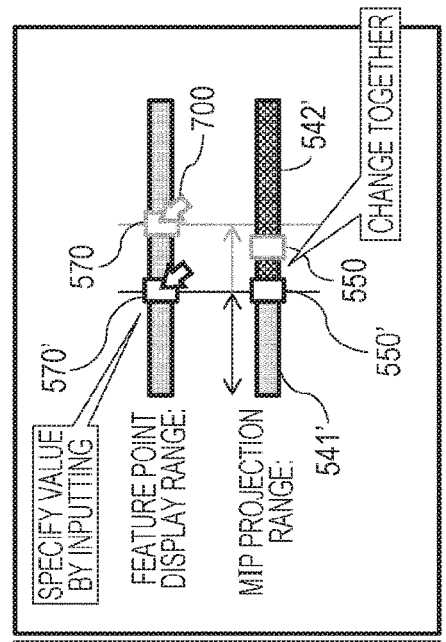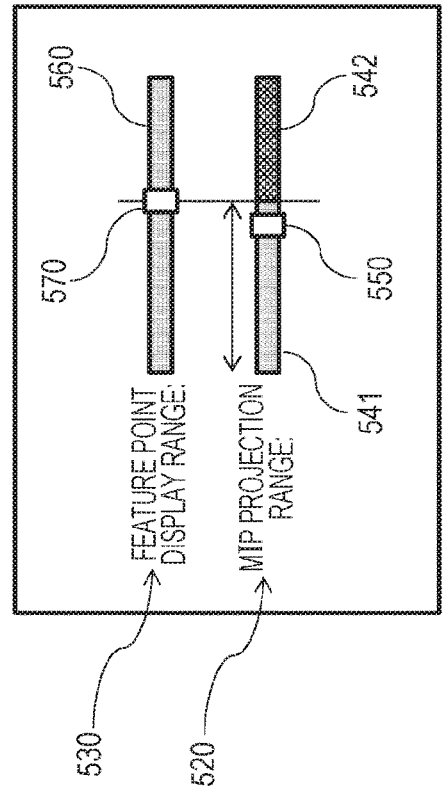

IMAGE PROCESSING APPARATUS, IMAGE PROCESSING METHOD, AND PROGRAM

BACKGROUND OF THE INVENTION

Field of the Invention

The present disclosure relates to an image processing apparatus, an image processing method, and a program, and more particularly, to a technique of displaying a projection image and a feature point of a 3-dimensional image.

Description of the Related Art

A maximum intensity projection method is generally used to visualize a tissue structure (a blood vessel or the like) in a 3-dimensional image captured using a medical imaging apparatus (X-ray CT, MRI, or the like). Japanese Patent Laid-Open No. 2013-70776 discloses a technique to generate a maximum intensity projection image such that for each pixel in a particular projection plane of a 3-dimensional image, a maximum value is acquired for voxel values of voxels of the 3-dimensional image on a line of sight crossing the pixel (that is, a maximum value on the line of sight is projected), and the acquired maximum value is employed as the value of the pixel. The maximum intensity projection image is also called a MIP (Maximum Intensity Projection) image.

In this technique, when a range in which voxels are projected is set across the projection plane (hereinafter, this range will be referred to as a projection range), only voxels in the projection range are subjected to the projection. A MIP image generated in a limited projection range as described above is generally called a slab MIP image. In this technique, a user sets the projection range such that a projection image is generated in a range of interest. In this technique, it is possible to more easily recognize continuity of a structure such as a blood vessel extending across a cross section than is possible in a case where only an image in a specified cross section is displayed.

In a case where a part to be observed is represented by voxel values lower than those in surrounding parts, a MinIP (Minimum Intensity Projection) image, in which not maximum values but minimum values are projected, is employed. Hereinafter, MIP images and MinP images are generically called projection images.

On the other hand, when locations of feature points of a 3-dimensional image are acquired, to make it possible for a user to recognize a distribution thereof, it is generally performed to display points such that 3-dimensional coordinates of feature points are projected onto a projection plane and the projected points are displayed. In particular, when a cross-section image of a 3-dimensional image is displayed, it is generally performed to project feature points such that the cross section is used as a projection plane, and feature points in a particular display range defined across the projection plane are projected onto the projection plane, and coordinates thereof are displayed such that they are superimposed on the cross-section image.

To display a distribution of feature points so as to be superimposed on a projection image, it is necessary to properly set a projection range of the projection image and a display range of feature points. However, in conventional image processing apparatuses, it is difficult to set the projection range and the display range, and thus it is difficult to display a distribution of feature points so as to be superimposed on the projection image.

SUMMARY OF THE INVENTION

In an aspect of the present disclosure, an image processing apparatus includes an image acquisition unit configured to acquire volume data, a feature point acquisition unit configured to acquire a coordinate of a feature point of an object in the volume data, a range setting unit configured to set a projection range defining a range of the volume data from which a projection image is to be generated, set a display range defining a range within which feature points are to be displayed, and adjust at least one of the projection range and the display range such that the projection range and the display range satisfy a predetermined relationship, and a display control unit configured to generate the projection image from the volume data according to the projection range and superimpose the feature point in the display range on the projection image.

Further features of the present invention will become apparent from the following description of exemplary embodiments with reference to the attached drawings.

BRIEF DESCRIPTION OF THE DRAWINGS

FIGS. 6A to 6D are diagrams illustrating examples of operations of a range setting unit according to the first embodiment.

FIGS. 9A to 9D are diagrams illustrating examples of operations of a range setting unit according to the third embodiment.

DESCRIPTION OF THE EMBODIMENTS

An image processing apparatus according to the present disclosure is described below with reference to embodiments in conjunction with accompanying drawings.

Figure 1:
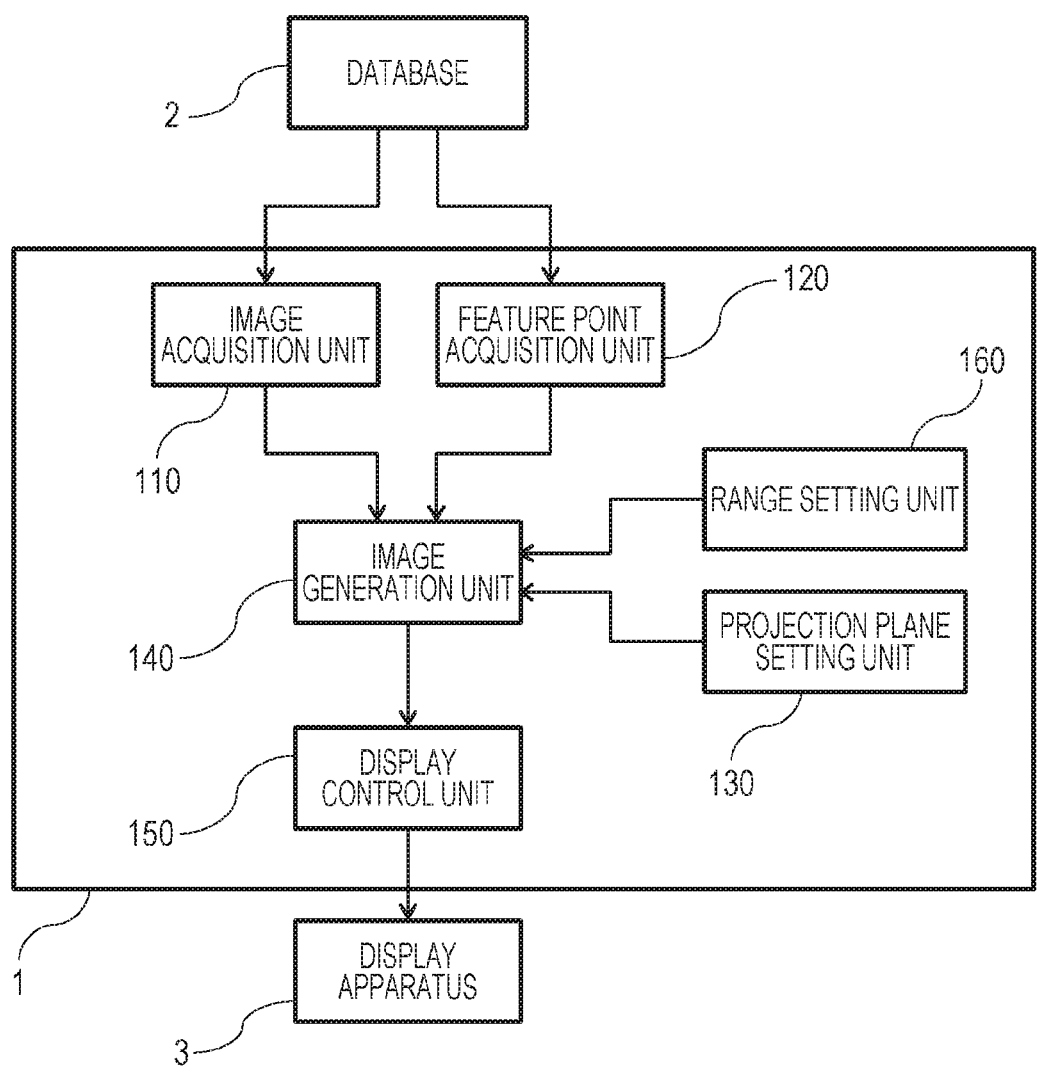
FIG. 1 is a diagram illustrating a configuration of an image display system according to a first embodiment.

FIG. 1 is a diagram illustrating an example of a configuration of an image processing system according to an embodiment. An image processing apparatus 1 includes an image acquisition unit 110 configured to acquire volume data. The image processing apparatus 1 also includes a feature point acquisition unit 120 configured to acquire coordinates of a feature point (a vessel bifurcation, a lesion part, or the like) of an object in volume data.

The image processing apparatus 1 further includes a range setting unit 160 configured to set a set value of a projection range of a projection image of volume data, set a set value of a display range of a feature point of volume data, and adjust at least one of the projection range and the display range such that the projection range and the display range satisfy a predetermined relationship. The image processing apparatus 1 further includes a display control unit 150 configured to generate a projection image from volume data in the projection range and superimpose a feature point in the display range on the projection image. The disclosure is described in further detail below with reference to specific embodiments.

First Embodiment

In a first embodiment described below as an example, in an apparatus configured to display a projection image and a feature point of a 3-dimensional image, a projection range of the projection image and a display range of the feature point are set, and the projection image and the feature point are displayed such that the feature point is superimposed on the projection image.

The image display system according to the present embodiment includes the image processing apparatus 1, a database 2, and a display apparatus 3. The image processing apparatus 1 is electrically connected to the database 2 and the display apparatus 3. The image processing apparatus 1 includes the image acquisition unit 110, the feature point acquisition unit 120, a projection plane setting unit 130, an image generation unit 140, a display control unit 150, and the range setting unit 160.

The image processing apparatus 1 controls a process of generating a projection image within the projection range and displaying it. The image processing apparatus 1 also controls a process of displaying a feature point within the display range such that the feature point is superimposed on the projection image. In these processes, the image processing apparatus 1 performs control (adjustment) such that the projection range and the display range satisfy a predetermined relationship. The database 2 stores 3-dimensional image data of objects collected by a medical imaging apparatus such as an X-ray CT, MRI, or the like. The database 2 also stores information about feature points in objects captured as 3-dimensional images. The display apparatus 3 may be a liquid crystal monitor or the like configured to display information processed by the image processing apparatus 1.

Figure 2:
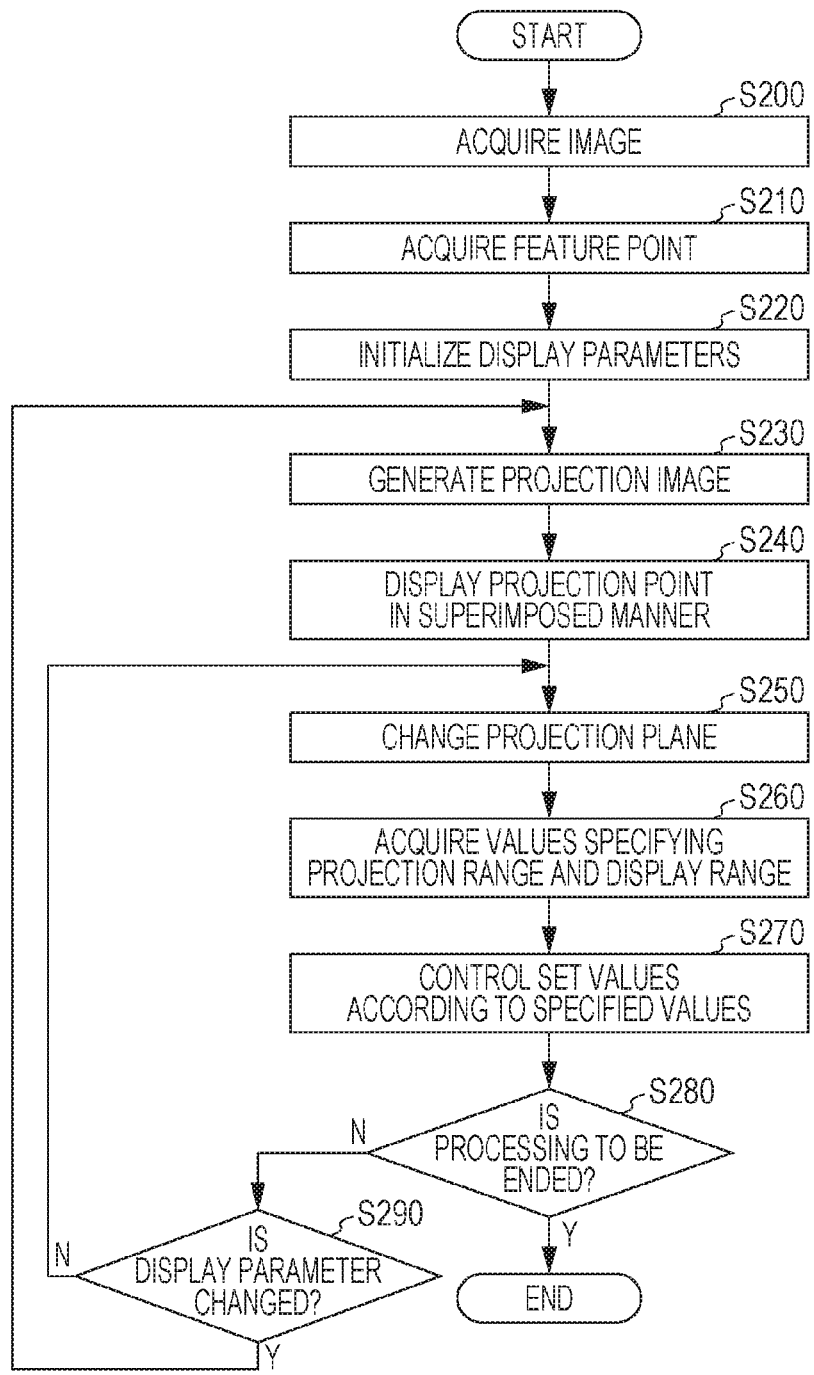
FIG. 2 is a flow chart illustrating a processing procedure according to the first embodiment.

Next, referring to a flow chart shown in FIG. 2, operations of various units in the image processing apparatus 1 and operation procedures thereof according to the present embodiment are described below.

(Step S200: Acquiring image) In step S200, the image acquisition unit 110 acquires a 3-dimensional image (volume data) captured for an object from the database 2. The image acquisition unit 110 transmits the acquired 3-dimensional image to the image generation unit 140. The 3-dimensional image is given in the form of volume data which is a set of voxels arranged in an x-direction, y-direction, and z-direction. Each voxel has a voxel value. For example, in the case of a CT image, the voxel value is a CT value.

(Step S210: Acquiring feature point) In step S210, the feature point acquisition unit 120 acquires, from the database 2, 3-dimensional coordinates of a feature point in the object captured in the form of the 3-dimensional image acquired in step S200. Note that it is assumed that the 3-dimensional coordinates of the feature point are represented in the same coordinate system as that in which the 3-dimensional image is represented. In a case where the information about the feature point is not stored in the database 2, a user may perform an operation of adding or changing a feature point using an input apparatus (not illustrated) such as mouse or the like thereby inputting information about the feature point. In this case, the input information about the feature point is transmitted to the image generation unit 140.

(Step S220: Initializing display parameter) In step S220, the range setting unit 160 sets initial values of set values of the projection range and the display range and transmits the information about them to the image generation unit 140. For example, values (for example, 10 mm) which are often employed in watching a volume image are employed as the initial values of the set values of the projection range and the display range.

In step S220, the projection plane setting unit 130 sets initial values associated with a projection plane and transmits information about them to the image generation unit 140. Note that the projection plane is a projection plane onto which the projection image is generated, and onto which the feature point is projected. The information about the projection plane is given by a position and a direction of the projection plane represented in a 3-dimensional image coordinate system.

The direction of the projected plane may be set so as to be parallel to an xy-plane (axial plane), a yz-plane (sagittal plane), or a zx-plane (coronal plane), or the direction of the projected plane may be set in any other direction. The initial values associated with the projection plane may be set, for example, such that the direction is set in the axial plane (xy-plane) and the position is set at the center of the volume image. Hereinafter, a coordinate transformation from the 3-dimensional image coordinate system to a projection plane coordinate system is represented by a transformation matrix T.

(Step S230: Generating projection image) In step S230, the image generation unit 140 generates a projection image of the 3-dimensional image acquired in step S200, based on the set values of the projection range and the information about the projection plane acquired in step S220 or acquired via a process following step S250. The generation of the projection image is performed as follows. Voxels of a 3-dimensional image located in the projection range are projected onto the acquired projection plane, and a maximum value of voxel values of voxels projected onto the same position (coordinate) in the projection plane is employed as a pixel value at this position (coordinate) thereby generating a maximum intensity projection image.

Note that the method of generating the projection image is not limited to the example described above, but any other methods may be employed as long as it is possible to generate a projection image in the projection range. Furthermore, the type of the projection image is not limited to the maximum intensity projection image, but the type of the projection image may be a minimum intensity projection image, a mean intensity projection image, or the like.

Figure 3:
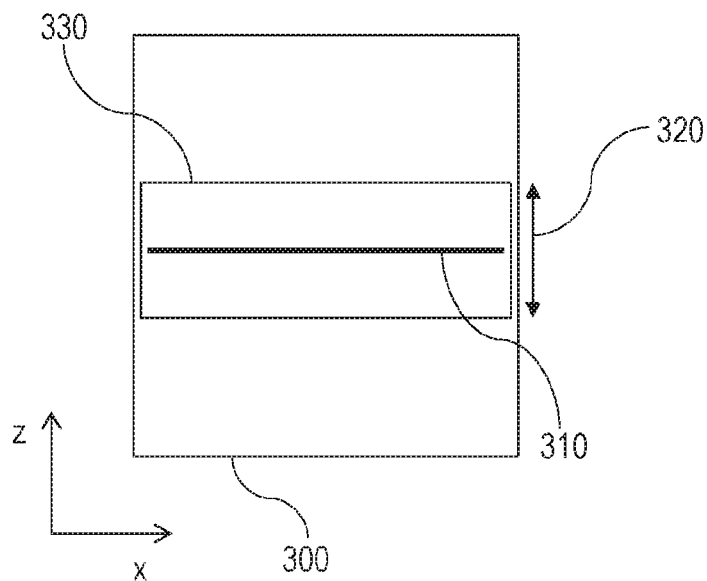
FIG. 3 is a schematic diagram illustrating a projection range according to the first embodiment.

The process of the projection image is described in further detail below with reference to FIG. 3. FIG. 3 is a diagram of a 3-dimensional image 300 seen from a normal direction (y-direction) of the xz-plane. The direction of the projection plane 310 is set in the axial plane (xy-plane). Note that the y-direction is a direction perpendicular to a drawing page. The projection range 320 is set (defined) by a particular distance (mm) from the projection plane 310 in both directions along the normal line (z-axis) of the projection plane 310.

In the process of generating the projection image onto the projection plane 310, voxels located in the projection range (in a rectangle 330 shown in FIG. 3) defined with reference to the projection plane 310 are subjected to the process. For example, in a case where the projection range 320 is 10 mm, voxels located within a range of ±5 mm from the projection plane 310 in the normal direction (z-direction) are subjected to the process.

(Step S240: Displaying feature point in superimposed manner) In step S240, based on the set value of the display range and the information about projection plane obtained in step S220 or obtained via the process following S250, the image generation unit 140 generates a display image in which the feature point acquired in step S210 is superimposed on the projection image generated in step S230. Furthermore, the display control unit 150 performs control so as to display the display image and a graphical user interface (GUI, described later with reference to FIG. 5) on the display apparatus 3.

Figure 4:
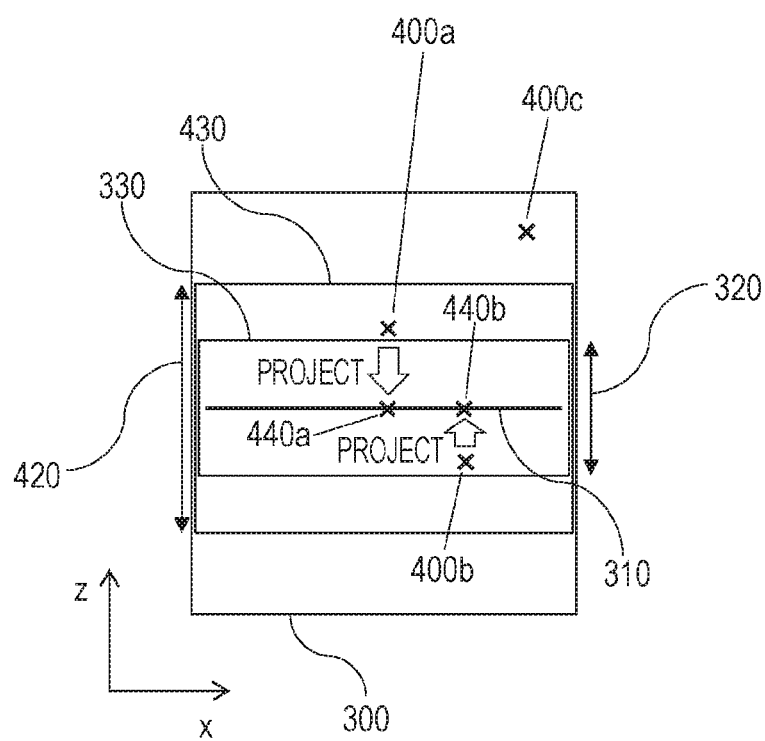
FIG. 4 is a schematic diagram illustrating a projection range and a display range according to the first embodiment.

The process of displaying the feature point is described in further detail below with reference to FIG. 4. FIG. 4 is a diagram in which the information associated with the display of the feature point is added to FIG. 3. The display range 420 is set (defined) by a particular distance (mm) across the projection plane 310 along a normal line (z-axis) of the projection plane 310. Feature points 400a and 400b located in the display range (in a rectangle 430 shown in FIG. 4) defined with reference to the projection plane 310 are projected onto the projection plane.

Maximum values of voxel values of voxels to be projected to the same locations (coordinates) in the projection plane 310 as those of the feature points 400a and 400b are employed as pixel values of these locations (coordinates). Furthermore, marks (for example, "x") indicating the existence of feature points are displayed at the respective locations (coordinates).

In the example shown in FIG. 4, marks representing the existence of the feature points 400a and 400b in the display range are respectively projected to 440a and 440b, but a mark indicating the existence of a feature point 400c outside the display range is not projected. On the other hand, even in a case where a feature point, like the feature point 400a, is located outside the projection range, if that feature point is located within the display range, a mark indicating the existence of the feature point is projected. To determine whether a specific feature point is within the display range, the image generation unit 140 transforms coordinates in a 3-dimensional image space of the feature points 400a, 400b, and 400c into coordinates with reference to the projection plane 310 (z=0) using the transformation matrix T.

Thereafter, the image generation unit 140 determines the distances of the feature points from the projection plane 310 based on the absolute values of z-coordinates obtained as a result of the transformation. For example, in a case where the set value of the display range 420 is 20 mm, feature points whose z-coordinate is within a range from −10 mm to 10 mm are displayed, but feature points outside the range are not displayed.

(Step S250: Changing projection plane) In step S250, the projection plane setting unit 130 accepts an operation performed by a user to change the projection plane 310, and transmits information about the change in the projection plane 310 to the image generation unit 140. A user is allowed to freely set a location and a direction of the projection plane 310 using a user interface such as a mouse, a keyboard, or the like (not shown) as with a known 3-dimensional image viewer.

(Step S260: Acquiring specified values of projection range and display range) In step S260, the range setting unit 160 acquires a specified value (specifying a change in the set value) of either one of the projection range 320 or the display range 420 specified by a user (in the process, the range setting unit 160 operates as a specified value acquisition unit). Herein the specified value is a value specified as a new set value. For example, sliders for respectively specifying the projection range 320 and the display range 420 may be displayed as GUIs on the display screen such that a user is allowed to move an indicator to change the set value of the projection range 320 or the display range 420. Thus it is possible to acquire a specified value given by a user.

In this process, in a state in which any slider has not yet been operated by a user, sliders functioning as indicators on respective bars indicate current set values of the projection range 320 and the display range 420, respectively. The user may operate the indicator of one of the two sliders (so as to move the indicator on the bar) thereby changing the current set value to a new value, that is, giving a new specified value.

When a specified value of a range is acquired by the range setting unit 160 in the present step for one of the projection range 320 and the display range 420, this one of the projection range 320 and the display range 420 (that is, the range for which the set value is changed) is referred to as a "range subjected to operation", while the other one of the projection range 320 and the display range 420 (that is, the range for which the set value is not acquired by the range setting unit 160, that is, the range for which the set value is not changed) is referred to as a "range not subjected to operation". The range setting unit 160 employs one of the projection range 320 and the display range 420 as a range subjected to operation and employs the other one as a range not subjected to operation, and the range setting unit 160 acquires a specified value specifying a set value of the range subjected to operation.

(Step S270: Controlling set value based on specified value) In step S270, the range setting unit 160 performs a process to set the set value of the range not subjected to operation based on the specified value of the range subjected to operation acquired in step S260. More specifically, the range setting unit 160 sets the specified value of the range subjected to operation as a new set value of the range subjected to operation, and adjusts the set value of the range not subjected to operation such that the specified value of the range subjected to operation and the set value of the range not subjected to operation satisfy the predetermined relationship.

The range setting unit 160 performs a process to determine (or adjust or control) new set values of the projection range 320 and the display range 420 according to the specified value of the range subjected to operation and the current set value of the range not subjected to operation. The range setting unit 160 transmits the determined set values to the image generation unit 140.

This process is performed such that the changed set value of the projection range 320 and that of the display range 420 satisfy the predetermined relationship. The range setting unit 160 employs the specified value of the range subjected to operation acquired in step S260 as a new set value of this range subjected to operation. Next, the range setting unit 160 determines whether the new specified value of the range subjected to operation and the current specified value of the range not subjected to operation satisfy the predetermined relationship. In a case where the predetermined relationship is satisfied, the range setting unit 160 does not change the current set value of the range not subjected to operation. On the other hand, in a case where the predetermined relationship is not satisfied, the range setting unit 160 performs a process to change (or adjust or control) the set value of the range not subjected to operation such that the predetermined relationship is satisfied.

In this process, as for the set value of the range not subjected to operation, a value that is closest to the current set value may be selected from values that satisfy the relationship. That is, the range setting unit 160 may perform the change such that the amount of change in the set value is as small as possible.

In the present embodiment, the predetermined relationship is that the display range includes the whole projection range. That is, the adjustment (the control) is performed such that the projection range 320 is not greater than the display range 420. More specifically, the new set value of the range subjected to operation is compared with the current set value of the range not subjected to operation, and, if the projection range 320 is greater than the display range 420, then the set value of the range not subjected to operation is changed (adjusted) so as to be equal to the new set value of the range subjected to operation.

That is, the projection range 320 and the display range 420 become equal to each other, and the relation that the display range includes the whole projection range is satisfied. That is, when the projection range 320 is the range subjected to operation, if the new set value of the projection range 320 is greater than the current set value of the display range 420, then the range setting unit 160 adjusts the set value of the display range 420 so as to be equal to the new set value of the projection range 320.

That is, in a case where the projection range 320 is greater than the display range 420, the range setting unit 160 adjusts the display range 420 so as to be equal to the projection range 320 thereby satisfying the predetermined relationship that the display range 420 includes the whole projection range 320.

On the other hand, when the display range 420 is the range subjected to operation, if the new set value of the display range 420 is smaller than the current set value of the projection range 320, the range setting unit 160 adjusts the set value of the projection range 320 so as to be equal to the new set value of the display range 420.

That is, in a case where the display range 420 is smaller than the projection range 320, the range setting unit 160 adjusts the projection range 320 so as to be equal to the display range 420 thereby satisfying the predetermined relationship that the display range 420 includes the whole projection range 320.

As described above, the range setting unit 160 adjusts at least one of the projection range 320 and the display range 420 so as to satisfy the predetermined relationship that the whole projection range 320 is included in the display range 420.

Figure 5:
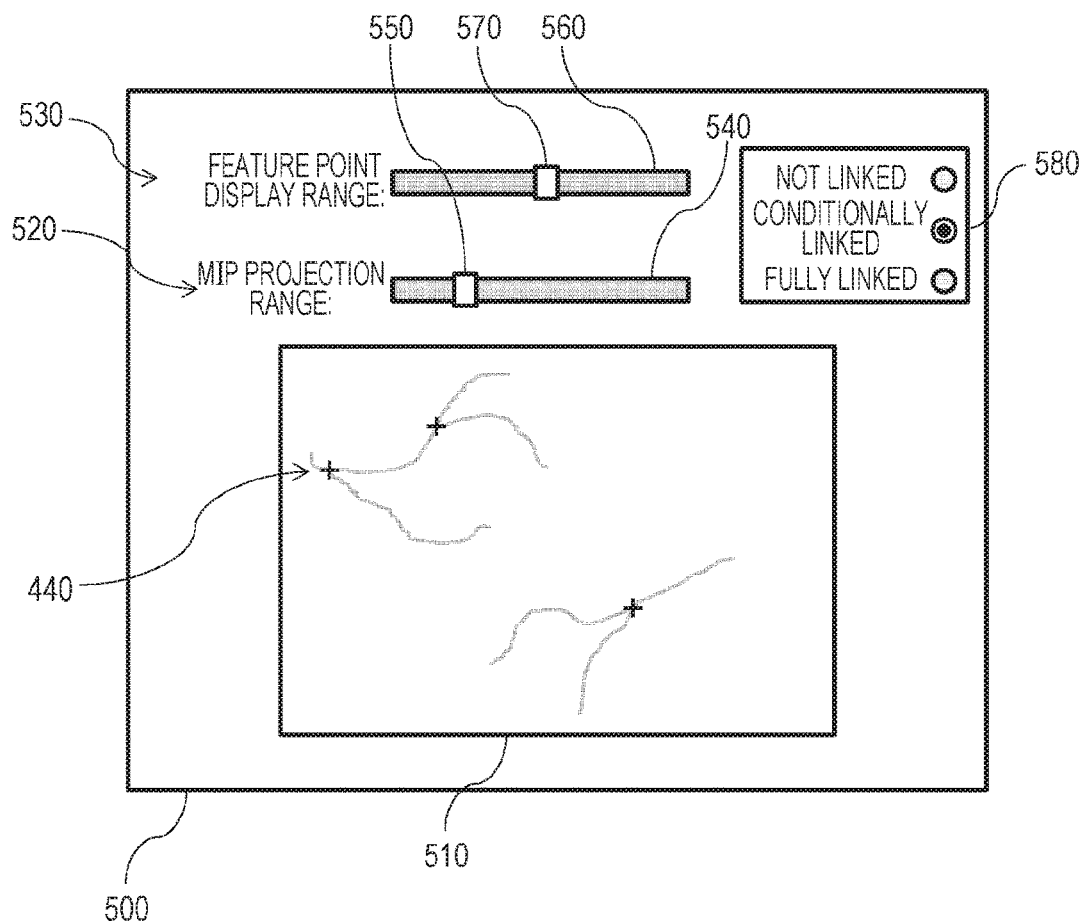
FIG. 5 is a diagram illustrating an example of a display screen according to the first embodiment.

Referring to FIG. 5, an example of a display screen displayed on the display apparatus 3 is described below. In the display screen 500 displayed on the display apparatus 3, a superimposed projection image 510 is displayed such that marks indicating the existence of feature points are superimposed on a projection image. The superimposed projection image 510 is an image generated by the image generation unit 140 in step S230 and step S240. More specifically, this image is generated such that a mark indicating the existence of a feature point 400 is superimposed on a projection image generated from a 3-dimensional image 300.

A projection range slider 520 is a GUI used by a user to input a specified value of the projection range 320 to the system. The projection range slider 520 includes a bar 540 and an indicator 550. The position of the indicator 550 on the bar 540 indicates the current set value of the projection range 320. If the indicator 550 is moved to the left, the projection range 320 is reduced. If the indicator 550 is moved to the right, the projection range 320 is increased. When the indicator 550 is located at the left edge of the bar 540, the projection range 320 is 0 mm. When the indicator 550 is located at the right edge of the bar 540, the projection range 320 has a maximum value.

The display range slider 530 is a GUI used by a user to input a specified value of the display range 420 to the system. The display range slider 530 includes a bar 560 and an indicator 570. The location of the indicator 570 on the bar 560 indicates the current set value of the display range 420. As the indicator 570 moves to the left, the display range 420 decreases, while as the indicator 570 moves to the right, the display range 420 increases.

As a result of the operation of the indicator, for example, if the value of the slider increases by 1, the projection range 320 and/or the display range 420 increases by 1 mm. However, if it is reduced by 1, then the projection range 320 and/or the display range 420 decreases by 1 mm.

Note that a linked operation mode designation unit 580 such as that shown in FIG. 5 may be displayed as a GUI on the display screen 500. When a linked operation mode is designated by a user, a plurality of ranges (the projection range 320 and the display range 420 in this case) are moved together in a linked manner.

For example, if "conditionally linked" is specified as the linked operation mode, the range setting unit 160 may control (adjust) the set value of the range not subjected to operation so as to satisfy the predetermined relationship (for example, the relationship described above) with the specified value of the range subjected to operation obtained in step S260.

On the other hand, in a case where "not-linked" is specified as the linked operation mode, the range setting unit 160 may perform a process to set the specified value of the range subjected to operation obtained in step S260 as a new set value without changing the set value of the range not subjected to operation. That is, the range setting unit 160 does not perform a process of control (adjust) the set value of the range not subjected to operation depending on the specified value of the range subjected to operation.

In a case where "fully linked" is specified as the linked operation mode, the range setting unit 160 may perform a process to employ the specified value of the range subjected to operation acquired in step S260 also as a new set value of the range not subjected to operation. That is, the range setting unit 160 performs control (adjustment) such that a plurality of ranges (the projection range 320 and the display range 420 in this case) are set to be equal value. Thus a user is allowed to select a proper linked operation mode and set ranges while watching the status of the projection image and the feature point.

Referring to FIGS. 6A to 6D, examples of processes performed by the range setting unit 160 in steps S260 and S270 are described below. FIG. 6A and FIG. 6B illustrate examples in which the projection range 320 is specified as the range subjected to operation and a specified value is given for the projection range 320. In FIG. 6A, the position of the indicator 550a and the position of the indicator 570a respectively indicate the current value of the projection range 320 and the current value of the display range 420. Let it be assumed here that a user operates the projection range slider 520 using a mouse cursor 700 to move the indicator 550 from a position 550a to a position 550b as shown in FIG. 6A.

In response, the range setting unit 160 acquires the specified value of the projection range 320 by detecting the position of the indicator 550b in step S260. Then in step S270, the range setting unit 160 employs the specified value pointed to by the indicator 550*b* as a new set value of the projection range 320.

In FIG. 6A, the current set value (indicated by the indicator 570*a*) of the display range 420 is greater than the new set value (indicated by the indicator 550*b*) of the projection range 320. That is, the predetermined relationship described above is satisfied, and thus the set value of the display range 420 is not changed. In a case where the specified value given by a user for the projection range 320 falls within a range denoted as "not-linked" in FIG. 6A, the predetermined relationship described above is maintained, and thus no change occurs in the set value of the display range 420.

Next, let it be assumed that a user moves the indicator 550 from a position 550*b* to a position 550*c* in FIG. 6B. In this case, in FIG. 6B, the current set value (indicated by the indicator 570*a*) of the display range is smaller than the new set value (indicated by the indicator 550*c*) of the projection range 320. That is, the predetermined relationship described above is not satisfied, and thus the range setting unit 160 changes the set value of the display range 420 from the position indicated by the indicator 570*a* to the position indicated by the indicator 570*b* in step S270.

In a case where the specified value given by a user for the projection range 320 falls within a range denoted as "linked" in FIG. 6B, the set value of the display range 420 is changed according to the given specified value (such that the set value of the display range 420 becomes equal to the specified value of the projection range 320). In this case, the position of the indicator 570 of the display range slider 530 is also changed to the same position as the position of the indicator 570*b*.

FIG. 6C and FIG. 6D illustrate examples in which the display range 420 is specified as the range subjected to operation and a specified value is given for the display range 420. Let it be assumed here that the indicator 570 of the display range slider 530 is moved by a user from a position 570*d* to position 570*e* as shown in FIG. 6C, and further from position 570*e* to a position 570*f* as shown in FIG. 6D. In this case, in FIG. 6C, the current set value (indicated by the indicator 550*d*) of the projection range 320 is smaller than the new set value (indicated by the indicator 570*e*) of the display range 420.

That is, the predetermined relationship described above is satisfied, and thus the set value of the projection range 320 is not changed. However, in FIG. 6D, the current set value (indicated by the indicator 550*d*) of the projection range 320 is greater than the new set value (indicated by the indicator 570*f*) of the display range 420. That is, the predetermined relationship described above is not satisfied, and thus the range setting unit 160 changes the set value of the projection range 320 from the value of the position of the indicator 550*d* to the value of the position of the indicator 550*e* in step S270. Specific operations are similar to those illustrated in FIG. 6A and FIG. 6B, and thus a further description is omitted.

In the example described above, the range setting unit 160 employs the specified value of the range subjected to operation as the new set value of the range subjected to operation, and changes the set value of the range not subjected to operation such that the predetermined relationship is satisfied. However, the process of determining the new set values of the projection range 320 and the display range 420 based on the specified value of the range subjected to operation and the current set value of the range not subjected to operation is not limited to that described above.

For example, in a case where the specified value of the range subjected to operation and the current set value of the range not subjected to operation do not satisfy the predetermined relationship, the set value of the range subjected to operation may be determined such that the relationship is satisfied. In this case, the set value of the range subjected to operation may be set such that a value closest to the specified value is selected from values satisfying the relationship, and the set value of the range subjected to operation is set to the selected value. That is, the set value of the range subjected to operation is changed such that the difference from the specified value is as small as possible. This makes it possible to achieve an effect, similar to that achieved in a third embodiment described later, that a change in the set value of the range subjected to operation does not influence the set value of the range not subjected to operation.

In a situation in which the projection range 320 or the display range 420 is specified as a range with high priority (high-priority range), when a specified value is given for either one of the ranges, the set value of a range with no priority (no-priority range) may be changed (adjusted) regardless of which range is specified as the range subjected to operation. For example, when the specified value of the high-priority range is operated, this specified value is set as a new set value of the range subjected to operation in a similar manner as described above, and the set value of the range not subjected to operation may be changed (adjusted) such that the predetermined relationship is satisfied. In a case where the specified value of the range with no priority is operated, the set value of the range subjected to operation may be changed (adjusted) according to the specified value without adjusting the set value of the range not subjected to operation such that the predetermined relationship is satisfied. That is, when the predetermined relationship is satisfied, the specified value is set as a new set value of the range subjected to operation. On the other hand, when the predetermined relationship is not satisfied, a value that is closest to the specified value is selected from values that satisfy the predetermined relationship, and the selected value is set (adjusted) as the new set value of the range subjected to operation. In this situation, whether the range with high priority is set or not and whether which range is given priority may be selected by a user via a linked operation mode designation unit 580 or the like (for example by adding a selection item).

(Step S280: Determining end of process) In step S280, the image processing apparatus 1 determines, based on an instruction given by a user or the like, whether the image display process is ended or not. In a case where it is determined that the process is not to be ended, the processing flow proceeds to step S290. However, when it is determined that the process is to be ended, the process of the image processing apparatus 1 is ended.

(Step S290: Determining occurrence of change in display parameter) In step S290, the image processing apparatus 1 determines whether a change has occurred in a display parameter (information about the projection plane 310, the set value of the projection range 320, the set value of the display range 420, or the like). In a case where a change has occurred, the processing flow returns to step S230 to repeat step S230 and following steps using a new display parameter. On the other hand, in a case where there is no change, the processing flow returns to step S250 to accept a change in display parameter.

In the present embodiment, the process described above is performed by the image processing apparatus such that the projection range 320 and the display range 420 are set such that the predetermined relationship is satisfied. Therefore, by setting the projection range properly for the projection image and setting the display range properly for the feature points, it becomes possible to observe information associated with the projection image and the feature point displayed under the condition suitable for observing them at the same time.

Furthermore, when the projection range is specified to be greater than the display range, imposing the condition that the display range includes the whole projection range causes the projection range and the display range to be set so as to be equal to each other. In a case where the projection range is greater than the display range of feature points and thus a feature point part located in an outer excessive part of the projection range is projected on the projection image, information indicating existence of these feature points corresponding to such a feature point part is not displayed on the projection image. However, this situation is avoided by imposing the condition that the display range includes the whole projection range.

As long as the predetermined relationship is satisfied, it is possible to independently specify the projection range and the display range. This makes it possible to specify the projection range, for example, such that the display range is specified so as to include a large range such as the whole object while a high-luminance region such as a body surface is excluded from the projection range. That is, it becomes possible to freely set the projection range and the display range.

Second Embodiment

In the first embodiment described above, the specified value of the range subjected to operation (for example, the projection range 320) and the current set value of the range not subjected to operation (for example, the display range 420) are compared, and the set value of the range not subjected to operation is changed such that predetermined relationship is satisfied.

In contrast, in a second embodiment described below, the image processing apparatus 1 holds the respective specified values of the projection range and the display range separately from the current set values of the projection range and the display range, and the image processing apparatus 1 determines newest set values depending on whether the specified values satisfy the predetermined relationship. The range setting unit 160 acquires specified values that specify the respective set values of the projection range 320 and the display range 420. The range setting unit 160 then sets (adjusts) the set values of the projection range 320 and the display range 420 based on the acquired specified values such that the set value of the projection range 320 and the set value of the display range 420 satisfy the predetermined relationship.

Operations of various units in the image processing apparatus 1 and operation procedures thereof according to the present embodiment are described below. One of features of the present embodiment is that part of the process performed by the range setting unit 160 in steps S220, 5260, and 5270 part of the process performed by the display control unit 150 in step S240 are different from those according to the first embodiment. A description of configurations, functions, and operations similar to those according to the previous embodiments described above is omitted, and the following description will focus on differences.

(Step S220: Initializing display parameter) In step S220, as in the first embodiment, the range setting unit 160 sets the set values of the projection range 320 and the display range 420, and sets the initial values of the projection plane 310, and the range setting unit 160 transmits the information about them to the image generation unit 140. Furthermore, in the present embodiment, the range setting unit 160 sets the initial values for the specified values of the projection range 320 and the display range 420. For example, the same values as the initial values of the set values of the projection range 320 and the display range 420 are set as the initial values of the specified values.

(Step S240: Displaying feature point in superimposed manner) In step S240, the image generation unit 140 generates a superimposed projection image 510 as in the first embodiment. The display control unit 150 performs control to display the superimposed projection image 510 and GUIs on the display apparatus 3. However, in the present embodiment, the manner of displaying the GUIs is partially different from the manner (shown in FIG. 5) according to the first embodiment.

More specifically, sliders 520 and 530 for respectively setting the projection range 320 and the display range 420 are displayed as GUIs on the display screen. More specifically, the current set values are indicated by the positions of the indicators 550 and 570, and icons representing the positions indicating the current specified values are displayed on the bars of the respective sliders.

(Step S260: Acquiring specified values of projection range and display range) In step S260, the range setting unit 160 updates one of specified values specified by a user for the projection range 320 and the display range 420 (in this process, the range setting unit 160 operates as a specified value acquisition unit). As in the first embodiment, sliders for respectively specifying the projection range 320 and the display range 420 are displayed as GUIs on the display screen such that a user is allowed to move the indicators, and specified values given by the user are acquired. The user may operate one of the indicators of the two sliders to input the specified value of the range subjected to operation. The range setting unit 160 updates (overwrites) the specified value of the range subjected to operation with the value obtained from the GUI. In this process, the specified value of the range not subjected to operation is maintained without being updated.

(Step S270: Controlling set value according to specified value) In step S270, the range setting unit 160 performs a process to determine (or adjust or control) new set values of the projection range and the display range according to the updated specified value of the range subjected to operation acquired in step S260 and the current specified value of the range not subjected to operation. The range setting unit 160 transmits the determined set values to the image generation unit 140.

This process is performed such that the changed set value of the projection range 320 and that of the display range 420 satisfy the predetermined relationship. That is, the range setting unit 160 employs the specified value of the range subjected to operation acquired in step S260 as the new set value of this range subjected to operation. Next, the range setting unit 160 determines whether the specified value of the range subjected to operation and the specified value of the range not subjected to operation satisfy the predetermined relationship.

In a case where the predetermined relationship is satisfied, the range setting unit 160 employs the specified value of the range not subjected to operation as the set value of this range not subjected to operation. On the other hand, in a case where the predetermined relationship is not satisfied, the range setting unit 160 sets (adjusts or controls) the set value of the range not subjected to operation such that the relationship is satisfied. In this process, as for the set value of the range not subjected to operation, the range setting unit 160 may select a value that is closest to the current specified value from values that satisfy the relationship.

Figure 7A:
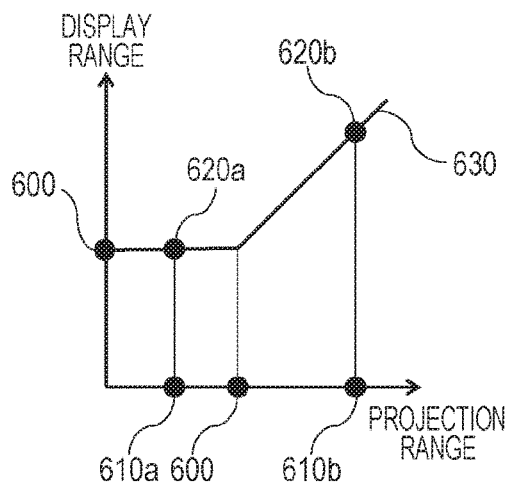
FIGS. 7A and 7B are diagrams illustrating examples of relationships between a projection range and a display range according to a second embodiment.
Figure 7B:
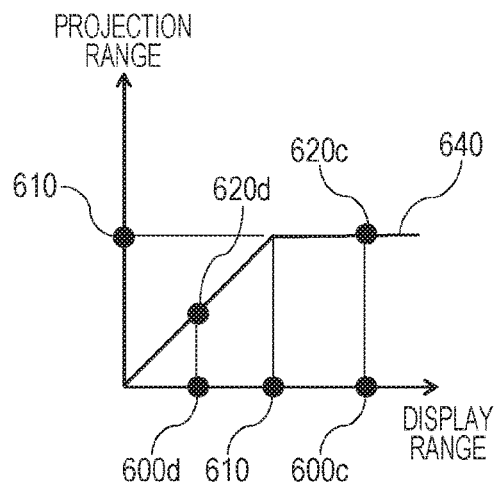

Referring to FIG. 7A and FIG. 7B, a description is given below as to a manner in which the set values of the projection range 320 and the display range 420 are controlled (adjusted) based on the specified values of the projection range 320 and the display range 420. In the following description, it is assumed by way of example that the predetermined relationship is that the display range includes the whole projection range.

In case where a user operates the projection range slider 520, that is, in a case where the range subjected to operation is the projection range, FIG. 7A illustrates relationships among the newly given specified value 610 of the projection range 320, the current specified value 600 of the display range 420, and the resultant projection range 320 and the set value 620 of the display range 420. When the specified value 610*a* of the projection range 320 is smaller than the specified value 600 of the display range 420, the two specified values satisfy the predetermined relationship, and thus the range setting unit 160 directly sets the specified values as the set value 620*a*.

On the other hand, when the specified value 610*b* of the projection range 320 is greater than the specified value 600 of the display range 420, the two specified values do not satisfy the predetermined relationship, and thus the range setting unit 160 sets the set values such that the predetermined relationship is satisfied. That is, the range setting unit 160 sets the specified value 610*b* of the projection range 320 as the set value 620*b* for both the display range 420 and the projection range 320.

As described above, in the case where the projection range 320 is greater than the display range 420, the range setting unit 160 adjusts the display range 420 so as to be equal to the projection range 320 thereby achieving the predetermined relationship that the display range 420 includes the whole projection range 320.

In the process described above, the range setting unit 160 always sets the specified value 610 as the projection range 320. Furthermore, the range setting unit 160 limits the display range 420 such that the display range 420 is not smaller than the specified value 600. That is, when the display range 420 is smaller than the given specified value 600, the range setting unit 160 adjusts the display range 420 so as to be equal to the projection range 320. That is, the specified value 600 of the display range 420 defines the minimum value of the display range 420. In other words, when the specified value 610 is greater than the minimum value (the specified value 600) of the display range 420 (that is, when the predetermined relationship described above is not satisfied), the range setting unit 160 sets (adjusts or controls) the display range 420 to be equal to the projection range 320. On the other hand, in a case where the specified value 610 is smaller than the minimum value 600 described above (that is, in a case where the predetermined relationship described above is satisfied), the range setting unit 160 sets the minimum value 600 as the display range 420.

In case where a user operates the display range slider 530, that is, in a case where the range subjected to operation is the display range, FIG. 7B illustrates relationships among the newly given specified value 600 of the display range 420, the current specified value 610 of the projection range 320, and the resultant projection range 320 and the set value 620 of the display range 420. In a case where the specified value 600*c* of the display range 420 is greater than the specified value 610 of the projection range 320, the two specified values satisfy the predetermined relationship, and thus the range setting unit 160 directly sets the specified values as the set value 620*c*.

On the other hand, in a case where the specified value 600*d* of the display range 420 is smaller than the specified value 610 of the projection range 320, the two specified values do not satisfy the predetermined relationship, and thus the range setting unit 160 sets the set values such that the predetermined relationship is satisfied. That is, the range setting unit 160 sets the specified value 600*d* of the display range 420 as the set value 620*d* for both the projection range 320 and the display range 420.

As described above, in a case where the display range 420 is smaller than the projection range 320, the range setting unit 160 adjusts the projection range 320 so as to be equal to the display range 420 thereby satisfying the predetermined relationship that the display range 420 includes the whole projection range 320.

In the process described above, the range setting unit 160 always sets the specified value 600 as the display range 420. Furthermore, the range setting unit 160 limits the projection range 320 such that the projection range 320 is not greater than the specified value 610. When the projection range 320 is greater than the given specified value 610, the range setting unit 160 adjusts the projection range 320 so as to be equal to the display range 420. That is, the specified value 610 of the projection range 320 serves as the maximum value of the projection range 320. In other words, when the specified value 600 is smaller than the maximum value (specified value 610) of the projection range 320 (that is, when the predetermined relationship described above is not satisfied), the range setting unit 160 sets (adjusts or controls) the projection range 320 to be equal to the display range 420. On the other hand, in a case where the specified value 600 is greater than the maximum value described above (that is, in a case where the predetermined relationship described above is satisfied), the range setting unit 160 sets this maximum value as the projection range 320.

In the present embodiment, unlike the first embodiment, the set values of the projection range 320 and the display range 420 are determined based on the specified values of the two ranges regardless of the current set value of the range not subjected to operation as described above. In FIG. 7A, the graph 630 is defined by the specified value 600 of the display range 420, and the set value 620 is given by the position on the graph 630 as a function of the specified value 610 of the projection range 320. In FIG. 7B, the graph 640 is defined by the specified value 610 of the projection range 320, and the set value 620 is given by the position on the graph 640 as a function of the specified value 600 of the display range 420.

In the present embodiment, the process described above is performed by the image processing apparatus such that the projection range and the display range are set such that the predetermined relationship is satisfied. In the image processing apparatus according to the present embodiment, when two specified values given by a user satisfy the predetermined relationship, those specified values are allowed to be used as the set values. However, in a case where the two specified values do not satisfy the predetermined relationship, the two set values are adjusted based on a specified value (of a range subjected to operation) specified more lately by a user such that the two set values satisfy the predetermined relationship.

In the previous embodiment (the first embodiment), when a decrease in specified value of the projection range 320 occurs after an increase, the set value of the display range 420 is not reduced but maintained at a value reached in response to the increase in the specified value of the projection range 320. This is because the "current set value" of the range not subjected to operation is employed as a reference in comparison in the first embodiment. In contrast, in the present embodiment, the specified values of the respective ranges are compared, and thus when such an operation as that described above is performed, it is possible to reduce the set value of the display range 420 to the original set value.

According to the present embodiment, for example, a user may specify a minimum value of the display range (a lower allowable limit of the display range) as the specified value of the display range, and the user may freely change the projection range while observing a 3-dimensional image. In this process, when the specified value of the projection range is greater than the specified value (minimum value) of the display range, the specified value of the projection range is set (in a linked manner) as the set value for both the projection range and the display range. That is, the user is allowed to observe a projection image and a feature point in the same range.

On the other hand, in a case where the specified value of the projection range is smaller than the specified value (minimum value) of the display range, the respective specified values are employed as the respective corresponding set values. This makes it possible to achieve an advantageous effect that the projection range of the projection image is allowed to be adjusted with no restriction, but a minimum allowable value is imposed on the display range of feature points, thereby making it possible to display feature points in a manner that allows a user to easily recognize relative locations of the feature points.

The present disclosure has been described above with reference to embodiments. However, the present disclosure is not limited to those embodiments, but many changes or modifications are possible without departing from the scope of the disclosure.

Modifications to Second Embodiment

In the second embodiment, a user is allowed to give specified values of both the projection range 320 and the display range 420. However, a user may be allowed to give a specified value for only one of ranges. For example, a user is allowed to specify only the projection range 320. In this case, a predetermined value may be set in advance as the specified value 600 of the display range 420. For example, the minimum value of the display range 420 (the lower allowable limit of the display range) may be predetermined, and this value may be used as the specified value of the display range 420.

Alternatively, a user may be allowed to specify only the display range 420. In this case, for example, the maximum value of the projection range 320 (the upper allowable limit of the projection range) may be predetermined, and this value may be used as the specified value of the projection range 320.

Thus, when two specified values satisfy the predetermined relationship, these specified values may be respectively used as corresponding set values. When two specified values do not satisfy the predetermined relationship, a specified value given by a user may be employed as one of set values, and the other one of the set values may be adjusted such that the predetermined relationship is satisfied.

Third Embodiment

In the first embodiment described above, there is no restriction on the specified value of the range subjected to operation, and the set value of the range not subjected to operation is adjusted depending on the given specified value of the range subjected to operation such that the set value of the projection range 320 and the display range 420 satisfy the predetermined relationship. In contrast, in a third embodiment described below, a specifiable range of the specified value is limited such that the predetermined relationship is satisfied. That is, depending on the current set value of one of the ranges, the specifiable range of the specified value of the other one of the ranges is limited thereby achieving control (adjustment) to make the two set values satisfy the predetermined relationship.

The range setting unit 160 sets the upper limit or the lower limit of one of the projection range 320 and the display range 420 based on the specified value of the other one of the projection range 320 and the display range 420.

More specifically, for example, the range setting unit 160 limits the movement of the indicator of the slider functioning as a GUI for acquiring the specified value thereby making it possible to control (adjust) the display range 420 not to be smaller than the projection range 320. For example, the current set value of the display range 420 may be employed as the upper limit below which the indicator 550 of the projection range slider 520 is allowed to move, thereby dynamically setting the specifiable range of the projection range 320. On the other hand, the current set value of the projection range 320 may be employed as the lower limit above which the indicator 570 of the display range slider 530 is allowed to move, thereby dynamically setting the specifiable range of the display range 420.

An image processing apparatus according to the present embodiment is described below. A description of configurations, functions, and operations similar to those according to the previous embodiments described above is omitted, and the following description will focus on differences.

(Step S240: Displaying feature point in superimposed manner) In step S240, the image generation unit 140 generates a superimposed projection image 510 in a similar manner to step S240 according to the first embodiment. The display control unit 150 performs a control process to display the superimposed projection image 510 and GUIs on the display apparatus 3. However, the GUIs displayed according to the present embodiment are partially different from those (FIG. 5) according to the first embodiment.

More specifically, in the present embodiment, the display control unit 150 acquires specifiable ranges of respective specified values from the range setting unit 160. When the sliders for setting the projection range 320 and the display range 420 are displayed as GUIs on the display screen 500, the range setting unit 160 displays the GUIs that allow the specified values to be specified only within the specifiable ranges (that is, it is not allowed to input values outside the specifiable ranges).

Figure 8:
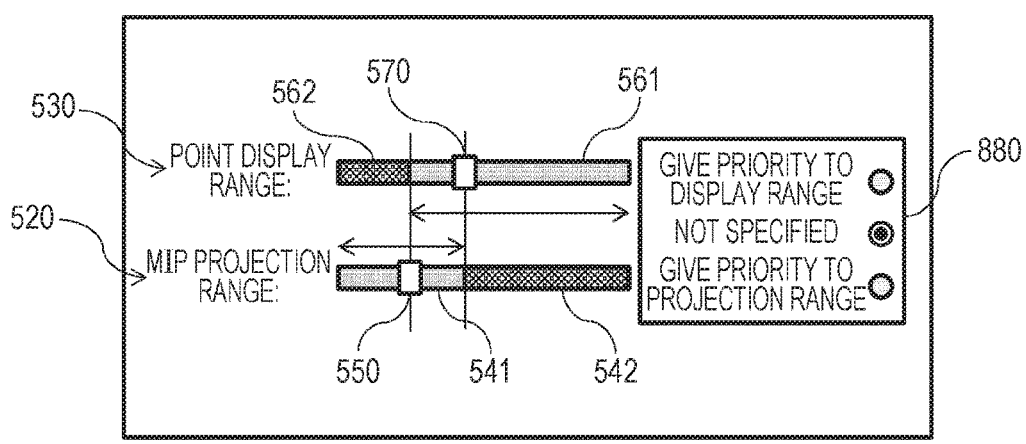
FIG. 8 is a diagram illustrating an example of a display screen according to a third embodiment.

FIG. 8 illustrates an example of a set of GUIs displayed in part of the display screen 500 according to the present embodiment. As in the first embodiment, the projection range slider 520 includes a bar 540 and an indicator 550. However, in the present embodiment, the bar 540 is divided into a specifiable range 541 indicating a range within which it is allowed to set a value (a value can be set) and an unspecifiable range 542 indicating a range in which it is not allowed to set a value (a value cannot be set), and they are displayed in different manners.

As a result, in the following process, the GUIs are controlled (adjusted) such that the indicator 550 is not allowed to move in the range of the unspecifiable range 542. Therefore, in the present embodiment, the specifying of the specified value by the projection range slider 520 is allowed only within the specifiable range 541. This applies also to the display range slider 530. That is, the GUI is displayed such that the specifying of the specified value by the display range slider 530 is allowed only within a specifiable range 561 of the display range 420 (FIG. 4) (and is not allowed in an unspecifiable range 562).

A linked operation mode designation unit 880 for selecting a linked operation mode may be displayed as a GUI on the display screen 500 such that a user is allowed to specify a linked operation mode in which two ranges are linked. For example, in a case where "no specified priority" is specified as the linked operation mode, the sliders may be displayed such that the specifiable ranges of the projection range 320 and the display range 420 shown in FIG. 4 are limited (as shown in FIG. 8).

In a case where "projection range priority" is specified as the linked operation mode, priority is placed on the projection range (the projection range is specified as a high-priority range) in the process. In this case, the projection range slider 520 is displayed with no restriction on the specifiable range such that the projection range 320 is allowed to be freely specified with no restriction as in the first embodiment. As for the display range slider 530, and only for it, the specifiable range 561 and the unspecifiable range 562 may be defined and displayed in a similar manner as described above (FIG. 9A).

In a case where "display range priority" is specified as the linked operation mode, priority is placed on the display range (the display range is specified as a high-priority range) in the process. That is, as for the display range slider 530, the slider is displayed without exerting a specifiable range as in the first embodiment such that the display range 420 is allowed to be freely specified with no restriction. On the other hand, as for the projection range slider 520, and only for it, the specifiable range 541 and the unspecifiable range 542 may be defined and displayed in a similar manner as described above (FIG. 9C).

Alternatively, the linked operation mode designation unit 880 may not be provided, and one of the linked operation modes described above may be used as a fixed value.

(Step S270: Controlling set value based on specified value) In step S270, the range setting unit 160 sets the specified value of the range subjected to operation obtained in step S260 as the set value of the range subjected to operation, and the range setting unit 160 transmits the set value to the image generation unit 140. The range setting unit 160 then controls (adjusts) the set values of the range not subjected to operation based on the specified value of the range subjected to operation. In this case, the details of the process of controlling (adjusting) the set value of the range not subjected to operation based on the specified value of the range subjected to operation are different depending on the linked operation mode.

In a case where "no specified priority" is specified as the linked operation mode, the specifiable range of the range not subjected to operation is controlled based on the new set value of one of the projection range 320 and the display range 420 specified as the range subjected to operation.

For example, when the projection range 320 is the range subjected to operation, the lower limit of the specifiable range 561' of the display range 420 is reset to the new set value of the projection range 320. On the other hand, when the display range 420 is the range subjected to operation, the upper limit of the specifiable range 541' of the projection range 320 is reset to the new set value of the display range 420. The set specifiable range is notified to the display control unit 150.

The method of controlling (adjusting) the range according to the present embodiment is described in further detail below with reference to specific examples. First, the method is described for a case where a user operates the projection range slider 520 to specify the projection range 320. In this case, as indicated by the specifiable range 541, the range allowed to be specified as the projection range 320 is limited to a range that is not larger than the current set value (the value indicated by the indicator 570) of the display range 420. That is, the user is not allowed to set a value, as the projection range 320, greater than the current set value of the display range 420.

Next, the method is described below for a case where a user operates the display range slider 530 to specify the display range 420. In this case, as indicated by the specifiable range 561, the range allowed to be specified as the display range 420 is limited to a range that is not smaller than the current set value (the value indicated by the indicator 550) of the projection range 320. That is, the user is not allowed to set a value, as the display range 420, smaller than the current set value of the projection range 320.

Therefore, set values of two ranges are controlled (adjusted) such that the predetermined relationship is maintained for the set values of the two ranges under the condition that the set values of the two ranges are specified by the user (not automatically changed by the apparatus).

In a case where "projection range priority" is specified as the linked operation mode, if a specified value of the display range 420 is acquired in step S260 (in a case where the range subjected to operation is the display range which is the no-priority range), the present step is ended. That is, in the case where "projection range priority" is specified as the linked operation mode, the process to set the specifiable range of the projection range 320 depending on the set value of the display range 420 is not performed.

In a case where "projection range priority" is specified as the linked operation mode, if a specified value of the projection range 320 is acquired in step S260 (in a case where the range subjected to operation is the projection range which is the high-priority range), a process similar to step S270 according to the first embodiment is performed. That is, the acquired specified value is set as a new set value of the projection range 320, and the set value of the display range 420 is changed (adjusted or controlled) such that the new set value of the projection range 320 and the current set value of the display range 420 satisfy the predetermined relationship. Furthermore, as shown in FIG. 9B, the lower limit 570' of the specifiable range 561' of the display range 420 is reset so as to be equal to the new set value 550' of the projection range 320, and information thereon is transmitted to the display control unit 150.

FIG. 9A and FIG. 9B illustrate examples of behaviors of GUIs for a case in which the projection range is changed from 550 to 550' when the "projection range priority" is specified as the linked operation mode. In response, the set value of the display range 420 is changed from 570 to 570' such that the predetermined relationship is satisfied. Furthermore, the specifiable range 561 of the display range 420 is changed to a specifiable range 561', and the unspecifiable range 562 is changed to an unspecifiable range 562'.

FIG. 9C and FIG. 9D illustrates examples of behaviors of GUIs for a case where "display range priority" is specified as the linked operation mode. When the linked operation mode is "display range priority", a process is performed in a similar manner as described above. That is, when a specified value of the display range 420 is obtained in step S260 (in a case where the range subjected to operation is the display range specified as the high-priority range), a process similar to step S270 according to the first embodiment is performed to change (adjust) the set value of the projection range 320. Furthermore, the upper limit of the specifiable range 541' of the projection range 320 is reset to be equal to the new set value of the display range 420, and information thereon is transmitted to the display control unit 150, although a further detailed description thereof is omitted.

In this operation mode, a user is allowed to specify, with no restriction, one of ranges to which priority is given such that the set value of the range with high priority is not changed regardless of the specifying value of the other range. Furthermore, it is possible to perform control (adjustment) such that the set values of the two ranges satisfy the predetermined relationship.

In the image processing apparatus 1 according to the present embodiment, based on a set value of one (range not subjected to operation) of the projection range 320 and the display range 420, the range setting unit 160 sets the specifiable range of the specified value of the other one (range subjected to operation) such that the predetermined relationship described above is satisfied.

The range setting unit 160 adjusts the specified value of at least one of the projection range 320 and the display range 420 such that the specified values of the projection range 320 and the display range 420 satisfy the predetermined relationship in the specifiable range. The range setting unit 160 then sets the respective adjusted specified values as new set values of the projection range 320 and the display range 420.

Thus, based on the specified value (or the current set value) of the projection range or the display range, it is possible to limit the specified value of the projection range or the display range given by a user. By setting the lower limit of the display range of feature point, it is possible to change the display range within a proper range while maintaining the projection range at a fixed value. By setting the upper limit of the projection range, it is possible to changing the projection range within a proper range while displaying feature points in a fixed display range.

The present disclosure has been described above with reference to embodiments. However, the present disclosure is not limited to those embodiments, but many changes or modifications are possible without departing from the scope of the disclosure.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-212929, filed Oct. 29, 2015, which is hereby incorporated by reference herein in its entirety.

What is claimed is:

1. An image processing apparatus comprising:
at least one memory storing instructions; and
at least one processor that, upon execution of the stored instructions is configured to operate as:
an image acquisition unit configured to acquire volume data;
a feature point acquisition unit configured to acquire a coordinate of a feature point of an object in the volume data;
a range setting unit configured to set a projection plane in the volume data, a projection range for generating a projection image from the volume data, which includes the projection plane and a first distance before and first distance behind the projection plane in a direction of a line normal to the projection plane, a display range of feature points to be superimposed on the projection image, which includes said projection plane and a second distance before and a second distance behind the projection plane in a direction of a line normal to the projection plane, and further configured to adjust at least one of the projection range and the display range such that the projection range and the display range satisfy a predetermined relationship in which the whole projection range is included in the display range; and
a display control unit configured to generate the projection image from the volume data according to the projection range and superimpose the feature point in the display range on the projection image.

2. The image processing apparatus according to claim 1, wherein in a case where the projection range is greater than display range, the range setting unit adjusts the display range so as to be equal to the projection range such that the predetermined relationship is satisfied.

3. The image processing apparatus according to claim 2, wherein
the range setting unit performs a process including
setting one of the projection range and the display range as a range subjected to operation and setting the other one as a range not subjected to operation,
acquiring a specified value specifying a set value of the range subjected to operation, and
setting the specified value as a new set value of the range subjected to operation, and adjusting the set value of the range not subjected to operation such that the specified value and the set value of the range not subjected to operation satisfy the predetermined relationship.

4. The image processing apparatus according to claim 2, wherein the range setting unit performs a process including setting one of the projection range and the display range as a high-priority range and setting the other one as a no-priority range, setting one of the projection range and the display range as a range subjected to operation and setting the other one as a range not subjected to operation, acquiring a specified value specifying a set value of the range subjected to operation, and in a case where the high-priority range is the range subjected to operation, setting the specified value as a new set value of the range subjected to operation, and adjusting the set value of the range not subjected to operation such that the predetermined relationship is satisfied, while in a case where the no-priority range is the range subjected to operation, adjusting the set value of the range subjected to operation based on the specified value without adjusting the set value of the range not subjected to operation such that the predetermined relationship is satisfied.

5. The image processing apparatus according to claim 2, wherein the range setting unit performs a process including acquiring specified values respectively specifying set values of the projection range and the display range, in a case where the specified values of the projection range and the display range satisfy the predetermined relationship, setting the respective specified values as new set values of the projection range and the display range, and in a case where the specified values of the projection range and the display range do not satisfy the predetermined relationship, setting new set values of the projection range and the display range based on at least one of the specified values such that the set values of the projection range and the display range satisfy the predetermined relationship.

6. The image processing apparatus according to claim 1, wherein in a case where the display range is smaller than the projection range, the range setting unit adjusts the projection range so as to be equal to the display range such that the predetermined relationship is satisfied.

7. The image processing apparatus according to claim 6, wherein the range setting unit performs a process including setting one of the projection range and the display range as a range subjected to operation and setting the other one as a range not subjected to operation, acquiring a specified value specifying a set value of the range subjected to operation, and setting the specified value as a new set value of the range subjected to operation, and adjusting the set value of the range not subjected to operation such that the specified value and the set value of the range not subjected to operation satisfy the predetermined relationship.

8. The image processing apparatus according to claim 6, wherein the range setting unit performs a process including setting one of the projection range and the display range as a high-priority range and setting the other one as a no-priority range, setting one of the projection range and the display range as a range subjected to operation and setting the other one as a range not subjected to operation, acquiring a specified value specifying a set value of the range subjected to operation, and in a case where the high-priority range is the range subjected to operation, setting the specified value as a new set value of the range subjected to operation, and adjusting the set value of the range not subjected to operation such that the predetermined relationship is satisfied, while in a case where the no-priority range is the range subjected to operation, adjusting the set value of the range subjected to operation based on the specified value without adjusting the set value of the range not subjected to operation such that the predetermined relationship is satisfied.

9. The image processing apparatus according to claim 1, wherein the range setting unit performs a process including setting a minimum value of the display range, acquiring a specified value of the projection range and setting the projection range to be equal to the acquired specified value, and setting the display range such that in a case where the specified value is greater than the minimum value, the display range is set to be equal to the projection range, while in a case where the specified value is smaller than the minimum value, the display range is set to be equal to the minimum value.

10. The image processing apparatus according to claim 1, wherein the range setting unit performs a process including setting a maximum value of the display range, acquiring a specified value of the display range and setting the display range to be equal to the acquired specified value, and setting the projection range such that in a case where the specified value is smaller than the maximum value, the projection range is set to be equal to the display range, while in a case where the specified value is greater than the maximum value, the projection range is set to be equal to the maximum value.

11. The image processing apparatus according to claim 1 wherein the range setting unit performs a process including setting one of the projection range and the display range as a range subjected to operation and setting the other one as a range not subjected to operation, acquiring a specified value specifying a set value of the range subjected to operation, and setting the specified value as a new set value of the range subjected to operation, and adjusting the set value of the range not subjected to operation such that the specified value and the set value of the range not subjected to operation satisfy the predetermined relationship.

12. The image processing apparatus according to claim 1 wherein the range setting unit performs a process including setting one of the projection range and the display range as a high-priority range and setting the other one as a no-priority range, setting one of the projection range and the display range as a range subjected to operation and setting the other one as a range not subjected to operation, acquiring a specified value specifying a set value of the range subjected to operation, and in a case where the high-priority range is the range subjected to operation, setting the specified value as a new set value of the range subjected to operation, and adjusting the set value of the range not subjected to operation such that the predetermined relationship is satisfied, while in a case where the no-priority range is the range subjected to operation, adjusting the set value of the range subjected to operation based on the specified value without adjusting the set value of the range not subjected to operation such that the predetermined relationship is satisfied.

13. The image processing apparatus according to claim 1 wherein
the range setting unit performs a process including
acquiring specified values respectively specifying set values of the projection range and the display range,
in a case where the specified values of the projection range and the display range satisfy the predetermined relationship, setting the respective specified values as new set values of the projection range and the display range, and
in a case where the specified values of the projection range and the display range do not satisfy the predetermined relationship, setting new set values of the projection range and the display range based on at least one of the specified values such that the set values of the projection range and the display range satisfy the predetermined relationship.

14. The image processing apparatus according to claim 1 wherein
the range setting unit performs a process including
setting one of the projection range and the display range as a range subjected to operation and setting the other one as a range not subjected to operation, and
setting a specifiable range of the specified value of the range subjected to operation based on the set value of the range not subjected to operation such that the predetermined relationship is satisfied.

15. An image processing method executed by an image processing apparatus, the method comprising:
acquiring, by a processor, volume data;
acquiring, by the processor, a coordinate of a feature point of an object in the volume data;
setting a projection plane in the volume data, a projection range for generating a projection image from the volume data, which includes the projection plane and a first distance before and first distance behind the projection plane in a direction of a line normal to the projection plane, a display range of feature points to be superimposed on the projection image, which includes said projection plane and a second distance before and a second distance behind the projection plane in a direction of a line normal to the projection plane, and adjusting at least one of the projection range and the display range such that the projection range and the display range satisfy a predetermined relationship in which the whole projection range is included in the display image; and
generating, by the processor for projection, the projection image from the volume data according to the projection range and superimposing the feature point in the display range on the projection image.

16. A non-transitory storage medium non-temporarily storing a program configured to cause a computer to execute a process, the process comprising:
acquiring, by a processor, volume data;
acquiring, by the processor, a coordinate of a feature point of an object in the volume data;
setting a projection plane in the volume data, a projection range for generating a projection image from the volume data, which includes the projection plane and a first distance before and first distance behind the projection plane in a direction of a line normal to the projection plane, a display range of feature points to be superimposed on the projection image, which includes said projection plane and a second distance before and a second distance behind the projection plane in a direction of a line normal to the projection plane, and adjusting at least one of the projection range and the display range such that the projection range and the display range satisfy a predetermined relationship in which the whole projection range is included in the display image; and
generating, by the processor for projection, the projection image from the volume data according to the projection range and superimposing the feature point in the display range on the projection image.

17. The image processing apparatus according to claim 1, wherein the projection image is a slab maximum.

* * * * *